July 2, 1935.  G. LAUBE ET AL  2,006,464
LENS MOUNT FOR CAMERAS
Filed Feb. 5, 1935

INVENTORS.
GROVER LAUBE, AND
EDWIN ALBERT KAUFMAN

BY

ATTORNEY.

Patented July 2, 1935

2,006,464

UNITED STATES PATENT OFFICE 2,006,464

LENS MOUNT FOR CAMERAS

Grover Laube and Edwin Albert Kaufman, Los Angeles, Calif., assignors to Fox Film Corporation, a corporation of New York Application February 5, 1935, Serial No. 5,037

16 Claims. (Cl. 95—45)

This invention relates to a lens mount for cameras and deals particularly with a mount developed for use in cinematography. One of the objects of the invention is to provide a lens mount comprising non-threaded telescoping sleeves wherein the objective is moved for focusing without rotation of the lens. In this respect we are aware of threaded telescoping sleeves, but this arrangement has all the disadvantages of becoming loose with wear and of allowing the outer end of the objective to drop slightly when the mount is fully extended, due principally to the fact that the outer end is entirely supported by the threaded sleeves. Our invention provides means for overcoming this.

In focusing lenses it is well known that the movement of the lens relative to the focal plane is not proportional to the change in distance of the object from the lens. As the focus approaches infinity, the movement of the lens becomes less; inversely, as the object is brought nearer the lens the movement of the lens relative to the focal plane becomes increasingly greater. Consequently, it is another object of this invention to provide a telescopic mount for an objective wherein substantially uniform movement of the focusing dial transmits non-uniform movement to the objective. This feature permits a uniform calibration on the focusing dial for variable focus of the lens, and lends itself particularly for use in motion picture cameras which, according to the present practice, are usually enclosed in a sound-proof cabinet. When enclosed in this manner, the focusing dial is controlled by a link and lever arrangement which can be operated from the outside of the cabinet. With a uniform calibration on the focusing dial it is clear that a substantially uniform calibration may be made on the remote link and lever control. This substantially uniform calibration becomes highly advantageous, in this arrangement, when it is necessary to "follow focus." It also permits accurate focusing on long shots wherein a slight movement of the objective is brought about by a comparatively large movement of the focusing dial. With this arrangement it is also possible to make quick focusing on all shots. In addition, the calibration of the focusing dial may be standardized for lenses of different focal length, which would automatically standardize the link and lever control.

Another object of the invention is to provide a lens mount having a non-rotatable sliding objective wherein the objective is movably supported on front and rear bearings. This insures a straight line movement of the objective for all positions of focus and maintains the principal axis of the lens in fixed relation to the focal plane.

More specifically, it is an object of this invention to provide a lens mount having an inner sleeve, an intermediate sleeve and an outer fixed sleeve wherein the inner and outer sleeves are slidably contacted for a bearing support by bearing members extending through the intermediate sleeve. In a telescoping sleeve arrangement of this nature it is obviously essential that a bearing support should be provided to maintain the inner sleeve in fixed relation to the outer sleeve in order to insure a precise parallel movement of the inner sleeve with respect to the fixed outer sleeve. A bearing of this nature will hold the objective from dropping down when the mount is fully extended, and will overcome the objection to the threaded mount.

Another object of the invention is to provide a lens mount consisting of telescoping sleeves wherein one of the sleeves is provided with cam-shaped slots. These slots may be compounded for multiplied movement or they may be shaped to provide any proportional amount of movement of the prime mover desired.

It is a further object of the invention to provide a lens mount consisting of three telescoping sleeves wherein one of the sleeves is provided with slots and the other sleeves carry rollers adapted to fit into said slots respectively. In order to insure close fit and to compensate for wear the walls of the slots may be tapered to take tapered rollers. In addition, the rollers may be spring-pressed into the slots so as to maintain a pressure engagement between the rollers and slots in all positions of the sleeves.

Another object of the invention is to provide a structure for a lens mount characterized by precision, dependability, durability and sturdiness.

Other objects and advantages will appear as the description proceeds in conjunction with the drawing in which.

Briefly stated, the preferred form of our invention comprises three non-threaded, telescoping sleeves as follows:

An outer fixed sleeve which may be termed the supporting sleeve. An intermediate sleeve which may be designated the cam sleeve, and an inner sleeve which carries the objective and may be called the objective mount. The sleeves are arranged so that rotary movement of the cam sleeve transmits linear movement to the objective mount. For this purpose we employ slots and rollers which interconnect the objective mount to the supporting sleeve by means of the cam sleeve. Certain novel features of the slots and rollers will become evident in the ensuing description. In addition the invention provides a novel bearing for the outer end of the objective against the supporting sleeve. The construction and arrangement of parts will be more fully described hereafter.

Figure 1:
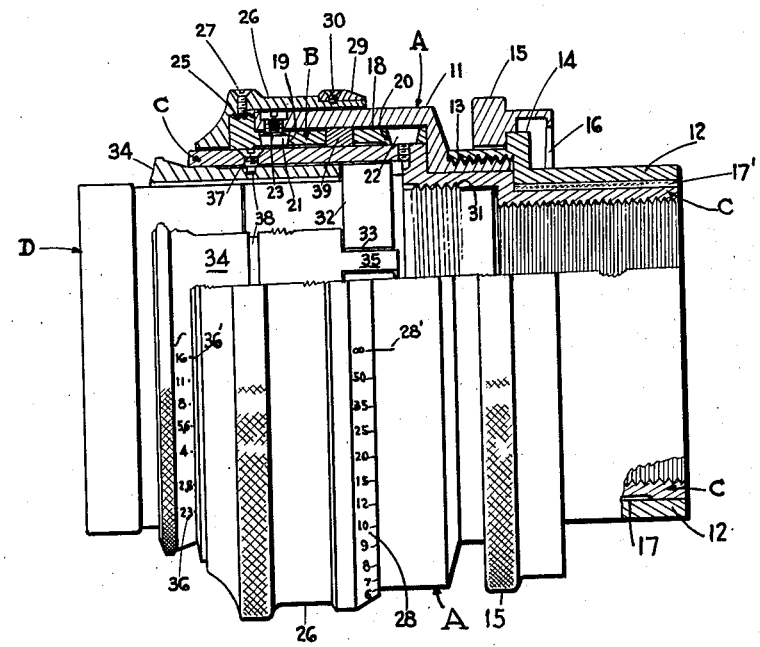
Figure 1 is an elevation partly in section of the lens mount as it appears fully assembled.

In the drawing we have shown our lens mount as it would be fully assembled and applied to a camera. Referring to Figure 1, it will be observed that the mount consists, broadly speaking, of a supporting sleeve generally designated A; a cam sleeve generally designated B; and a sleeve generally designated C, which is the objective mount. These sleeves are mounted in a telescoping arrangement as shown, and means is provided for moving the objective mount relative to the supporting sleeve.

The supporting sleeve A, as shown, is divided into two parts, 11 and 12, which are connected by a screw threaded connection 13. The shank 12 is adapted to fit into a camera and has a shoulder 14 formed thereon. A ring 15 is movably mounted over said shoulder and is provided with a square thread 16 which in practice engages a thread on the camera, not shown. The sleeve A is provided with a smooth bore 17 at one end and an enlarged smooth bore 18 at the opposite end. Inside the bore 18 the cam sleeve B is adapted to be rotatably mounted. The cam sleeve as shown is provided with slots 19 and 20 into which rollers 21 and 22 are adapted to fit, respectively. These slots and rollers, as illustrated, are tapered and the rollers are spring-pressed into the slots by means of springs 23 and 24, respectively. (See Fig. 3.) The purpose of this construction is to insure a close fit between the rollers and the walls of the slots and results in accuracy in that there is no lost motion between the supporting sleeve and the objective mount, and the rollers will automatically compensate for wear.

The outer end of the cam sleeve B is equipped with a screw-threaded portion 25 upon which a manually accessible sleeve 26 is screw-threadedly mounted, said sleeve extending inwardly over the outer surface of the supporting sleeve A. The sleeve 26 and the sleeve B may be locked in their screw-threaded connection by a set screw 27. On the inner end of the sleeve 26 we provide the focusing calibration indicia 28, which is carried on a ring 29, said ring being detachably mounted on the sleeve 26 and held in position by a set screw 30. The purpose of this arrangement is to permit initial calibration of the focusing dial with respect to the focus of the lens and also, if desirable or necessary, the ring 29 may be exchanged for another ring with different indicia.

The inner sleeve C, which has been termed the objective mount, is slidably supported at its rear end in the smooth bore 17 of the part 12 of the sleeve A, and is held against rotation by means of a key 17'. The opposite end of the sleeve C is enlarged and is adapted to support the cam sleeve B. As shown in Figure 1, the cam sleeve B is adapted to be rotatably supported upon the outer surface of the objective mount. Means is provided for mounting a lens barrel D in the objective mount, and according to general practice consists of screw threads 31.

This invention also provides means for operating the aperture diaphragm. In the lens barrel shown, the diaphragm control ring 32 is provided with a slot 33. A sleeve 34 is arranged over the lens barrel D and is equipped with a tongue 35 which is adapted to fit into the slot 33. The outer end of the sleeve 34 extends beyond the outer end of the sleeve C and carries calibrations 36 for designating the aperture which may be read against any suitable index such as a mark 36' on the outer end of the sleeve C. The sleeve 34 may be held in sliding engagement with the sleeve C and the lens barrel D by means of a screw 37 mounted in the sleeve C and extending into a slot 38 in the sleeve 34.

Referring to the cam sleeve B, it will be noted that a bearing member 39 is disposed between the rollers 21 and 22, said bearing member extending through the sleeve B and engaging the sleeve A and the sleeve C. In practice there is a plurality of such bearing members and they may be disposed or placed wherever found convenient or desirable. These bearing members constitute a support for the objective mount at the front end against the supporting sleeve and, in the arrangement shown, travel with the sleeve B. The structure just described furnishes a rigid sliding bearing support for the front end of the sleeve C and, as has been stated hereinbefore, the sleeve C is journalled at the rear end in that portion 12 of the sleeve A which yields a rigid sliding double support that holds the sleeve C in fixed sliding relation to the supporting sleeve A.

Figure 2:
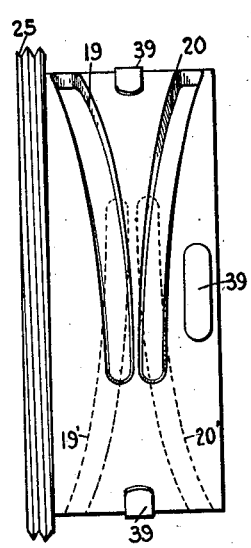
Figure 2 is a side elevation of the cam-sleeve showing one arrangement of slots which may be used in our invention.
Figure 3:
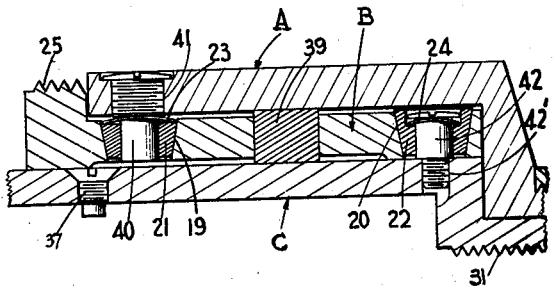
Figure 3 is an enlarged fragmentary view of the cam-sleeve and roller arrangement.

The means whereby rotary movement is converted into linear movement for moving the objective mount comprises the slots 19 and 20 in the cam sleeve B and the rollers 21 and 22 arranged in the slots respectively. Referring to Figure 3, it will be seen that the roller 21 is carried on a pin 40, said pin in turn being screw-threadedly mounted in the sleeve A shown at 41. The roller 22 is rotatedly mounted on a pin 42, which pin is screw-threadedly mounted in the sleeve C shown at 42'. It will be noted that whereas the roller 21 is spring-pressed into the slot 19 by means of the spring member 23 bearing against an enlarged portion of the pin, the roller 22 is spring-pressed into the slot 20 by means of the spring member 24 bearing against the head of the screw. With reference to the slots 19 and 20 in the cam member B, it is evident that these slots may take a variety of forms. As previously stated, one of the objects of this invention is to provide a focusing dial wherein uniform movement of the dial produces non-uniform movement of the lens. In accordance with this, the slots 19 and 20 as illustrated in Figure 2 have been formed in cam shapes. In addition, the slots 19 and 20 have been reversed so as to yield a multiplied movement upon rotation of the cam sleeve B. There may be a plurality of such slots as shown by the dotted slots 19' and 20', or the slots may take another form in which only one of the slots is cam-shaped.

In operation the lens barrel D is mounted in the objective mount C, and the focusing mount is assembled as shown in Figure 1. For initial calibration of the focusing dial with respect to the lens, the set screw 30 would be loosened and the ring 29 would be set to register the calibration on the dial with the exact focal length of the lens. The screw 30 would then be set and the mount would be ready for focusing. In focusing, the sleeve 26 is rotated which carries with it the dial 28 and at the same time advances the slots 19 and 20 past the rollers 21 and 22 respectively, which forces the rollers toward or away from each other depending upon which direction the dial is rotated. The amount of rotation necessary is indicated by the indicia 28 on the ring 29, which may be read against an index mark 28' on the sleeve A. Since the roller 21 is fixed in the supporting sleeve, and the roller 22 is fixed in the objective mount, and since the objective mount is non-rotatably, slidably supported in the supporting sleeve, it becomes obvious that as the sleeve B is rotated the objective mount C is forced to travel backward and forward in the supporting sleeve. The bearing members 39 are arranged to maintain a close sliding engagement between the sleeve C and the sleeve A at all points of movement.

With the foregoing arrangement it is possible to arrange the slots in the cam sleeve so that uniform rotation of the focusing dial will bring the lens into exact focus for variable distances. For example, it may be arranged so that it requires the same amount of turning of the focusing dial to bring the focus from infinity to fifty feet as is required to bring the focus from four to two feet. This is a step in the direction of accuracy and convenience. It is also apparent that with the front and rear support for the objective mount, all movement of the objective mount must be a straight line movement which maintains the principal axis of the lens in fixed relation to the focal plane at all positions of focus. An arrangement of this nature will have particular usefulness in cinematography but will also have a certain amount of usefulness in other fields wherever it is required to focus lenses for cameras.

Altho we have shown and described our invention in a specific form, we do not wish to limit the invention to the exact construction shown but intend this disclosure to cover all such modifications arising from refinements and alterations that come within the scope of the specification and the purview of the appended claims.

We claim:

1. For use with a camera, a focusing mount comprising: an objective mount; a supporting member for said objective mount; a sleeve having slots therein disposed between said supporting member and said objective mount, and rollers carried by said supporting member and said objective mount engaging respective slots in said sleeve.

2. For use with a camera, a focusing mount comprising: an objective mount; a supporting member for said objective mount; a sleeve having a plurality of cam-shaped slots therein disposed between said supporting member and said objective mount, and rollers carried by said supporting member and said objective mount engaging respective slots in said sleeve.

3. For use with a camera, a focusing mount comprising: an objective mount; a supporting member for said objective mount; a sleeve having a plurality of cam-shaped slots therein disposed between said supporting member and said objective mount, said slots having sloping walls and tapered rollers carried by said supporting member and said objective mount engaging respective slots in said sleeve.

4. For use with a camera, a focusing mount comprising: an objective mount; a supporting member for said objective mount; a sleeve having a plurality of cam-shaped slots therein disposed between said supporting member and said objective mount, said slots having sloping walls and spring-pressed tapered rollers carried by said supporting member and objective mount engaging respective slots in said sleeve.

5. For use with a camera, a focusing mount comprising: an objective mount; a supporting member for said objective mount; a sleeve having slots therein disposed between said supporting member and said objective mount; rollers carried by said supporting member and said objective mount engaging respective slots in said sleeves and bearing members extending through said sleeve and engaging said supporting member and said objective mount.

6. For use with a camera, a focusing mount comprising: an objective mount; a supporting member for said objective mount; a sleeve having slots therein disposed between said supporting member and said objective mount; rollers carried by said supporting member and said objective mount engaging respective slots in said sleeves and bearing members extending through said sleeve and slidably engaging said supporting member and said objective mount.

7. In a focusing mount for cameras, the combination of: an objective mount carried in a supporting member and a bearing between said objective mount and said supporting member near each end of the objective mount.

8. In a focusing mount for cameras, the combination of: an objective mount carried in a supporting member and means for moving said objective mount relative to the supporting member, said means including a sleeve having cam-shaped slots engageable by rollers on said objective mount and said supporting member respectively.

9. In a focusing mount for cameras, the combination of: an objective mount carried in a supporting member; means for moving said objective mount relative to the supporting member, said means including a sleeve having cam-shaped slots engageable by rollers on said objective mount and said supporting member respectively, and bearing members between said objective mount and said supporting member extending through said sleeve.

10. In a focusing mount for cameras, the combination of: an objective mount carried in a supporting sleeve, one end of said objective mount being journalled in said supporting sleeve and the opposite end annularly spaced therefrom; a rotatable sleeve disposed in said annular space and bearing members extending through said rotatable sleeve for supporting said objective mount on said supporting sleeve.

11. In a focusing mount having a supporting member and an objective mount carried thereby: means for moving said objective mount linearly with respect to said supporting member, said means including a cam sleeve having slots therein adapted to engage rollers fixed on said supporting member and said objective mount respectively, said slots being shaped to impart non-uniform movement to said objective mount upon uniform movement of said cam sleeve.

12. In a focusing mount having a supporting member and an objective mount carried thereby: means for moving said objective mount linearly with respect to said supporting member, said means including a cam sleeve having slots therein adapted to engage rollers fixed on said supporting member and objective mount respectively, said slots being shaped to impart non-uniform movement to said objective mount upon uniform movement of said cam sleeve, there being pairs of said slots and rollers with the slots arranged in reverse order to yield a multiplied movement.

13. In a focusing mount having a supporting member and an objective mount carried thereby: means for moving said objective mount linearly with respect to said supporting member, said means including a cam sleeve having slots therein adapted to engage rollers fixed on said supporting member and said objective mount respectively, said cam sleeve having an external sleeve extending over the outer periphery of said supporting member and focusing indicia carried on said external sleeve.

14. A structure as set forth in claim 13 wherein said focusing indicia is detachably mounted on said external sleeve.

15. A structure as set forth in claim 13 wherein said focusing indicia is adjustably mounted on said external sleeve.

16. In a focusing mount having a supporting member and an objective mount carried thereby: means for moving said objective mount linearly with respect to said supporting member, said means including a cam sleeve having slots therein adapted to engage rollers fixed on said supporting member and said objective mount respectively, said cam sleeve having an external sleeve extending over the outer periphery of said supporting member and a ring having focusing indicia thereon detachably and adjustably mounted on said external sleeve.

GROVER LAUBE.
EDWIN ALBERT KAUFMAN.